US006799360B1

(12) United States Patent
Chen

(10) Patent No.: US 6,799,360 B1
(45) Date of Patent: Oct. 5, 2004

(54) PROCESS FOR PRECESSING AN INFANT SEAT BODY USED IN VEHICLES

(75) Inventor: Shun-Min Chen, Taipei Hsien (TW)

(73) Assignee: Kenny Cheng, Taipei (TW)

( * ) Notice: Subject to any disclaimer, the term of this patent is extended or adjusted under 35 U.S.C. 154(b) by 24 days.

(21) Appl. No.: 10/281,864

(22) Filed: Oct. 28, 2002

(51) Int. Cl.⁷ ........................... B23P 13/04; B23P 11/00
(52) U.S. Cl. .................................. 29/527.1; 29/525.14
(58) Field of Search .......................... 29/527.1, 527.2, 29/527.3, 527.4, 527.5, 527.6, 525.14; 264/46.6, 271.1, 278, 46.7

(56) References Cited

FOREIGN PATENT DOCUMENTS

JP         08207061      *   8/1996

* cited by examiner

Primary Examiner—John C. Hong
(74) Attorney, Agent, or Firm—Gauthier & Connors, LLP

(57) ABSTRACT

A process for molding an infant safety seat body for vehicles includes the steps of forming a contoured seat frame, disposing the contoured seat frame in a mold having the shape of the infant safety seat body, pouring foam into said mold and polymerizing the foam to form a cushion substrate, and stripping the foam from the mold.

2 Claims, 4 Drawing Sheets

PROCESS FOR PRECESSING AN INFANT SEAT BODY USED IN VEHICLES

FIELD OF THE INVENTION

The present invention relates to a method for the production of contoured bucket seat body of an infant safety seat used in vehicles and the seat body obtained.

BACKGROUND OF THE INVENTION

The occupant restraint belt systems which vehicles are equipped with by the manufacturers are unsuited for use by small children. Accordingly, a variety of special child restraint systems are available and in widespread use. The most common type of child restraint system is a special seat which rests on a vehicle seat and is suitably fastened in place by the vehicle restraint belt system.

A conventional known child safety seat 100 shown a FIG. 5 includes a contoured bucket seat body 10, a support device 15, and a base 19. The contoured bucket seat body 10 usually consists of a one-piece contoured plastic body 12 covered with padding 20 and fitted with a restraint belt system composed of two waist belts 70, 72 and a crotch belt 74. The contoured plastic body 12 can be formed from a blow molding or an injection molding synthetic resin, including one or more of polypropylene, low density polyethylene, high density polyethylene, polycarbonate, and ABS plastic. Then, a sheet of prefabricated cushioning padding 20, for example, polyurethane foam, is glued to the resulted plastic body 12 to absorb any impact so as to ensure comfort and safety features.

This conventional method of making a contoured bucket seat body 10 has involved (1) cutting the cushion material according to an appropriated pattern; (2) adhering the cut material. High labor costs result since, in many instances, the cutting and gluing operations are extensive and mostly has to be performed by hand. Additionally, the plastic body 12 is entirely formed of synthetic resin, the weight of seat body 10 is thus significantly increased.

SUMMARY OF THE INVENTION

The principal object of the present invention is to provide a low cost contoured bucket seat consisting of a foam body with an embedded frame that is constructed to provide requisite strength for safety.

Another object of the present invention is to provide a unitary seat that is lighter in weight than conventional contoured bucket seat.

Yet another object of the present invention is to provide a molding process of a low cost contoured bucket seat used by an infant safety seat for vehicles.

The above-mentioned objects can be achieved by a process for molding an infant safety seat body for vehicles which comprises, forming a contoured seat frame, disposing the contoured seat frame in a mold having the shape of the infant safety seat body, pouring foam into said mold and polymerizing the foam to form a cushion substrate, and stripping the foam from the mold.

BRIEF DESCRIPTION OF THE DRAWINGS

The above and other objects and features of the present invention will become more apparent from the following description of the preferred embodiments thereof with reference to the accompanying drawings, throughout which take like parts are designated by like reference numerals, and wherein.

DESCRIPTION OF PREFERRED EMBODIMENT

Figure 1:
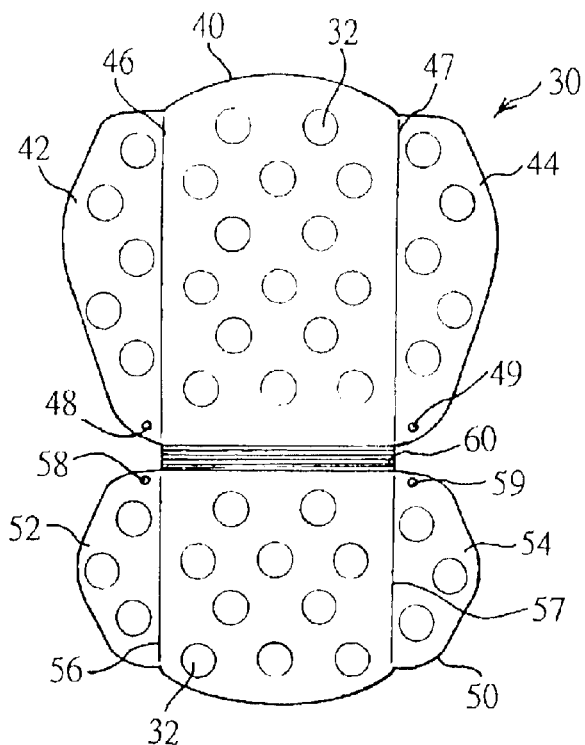
FIG. 1 is a plan view of a porous plate according to this invention.

Referring now to FIG. 1, which shows a plan view of a porous plate 30 integrally formed in a one-piece construction by injection molding from a synthetic resin, including one or more of polypropylene, low density polyethylene, high density polyethylene, polycarbonate, and ABS plastic, into the shape illustrated in FIG. 1 of the drawings. The thickness of the plate can be in the typical range of 0.05 to 0.50 inches but normally is about 0.075 inches thick, depending on the material and application. This provides a very strong and durable product to enable an infant to be comfortably supported and protected.

The porous plate 30 consists of an upper back section 40 and a lower bottom section 50 seamed with a foldable border 60, which is a straight-line indentation strip so that the upper back section 40 and the lower bottom section 50 will bend to each other to form a contoured seat. The upper back section 40 further includes a pair of side portions 42, 44, each of which respectively intersects the upper back section 40 with a foldable border 46, 47 formed of a straight-line indentation. The lower bottom section 50 further includes a pair of arm portions 52, 54, each of which respectively intersects the lower bottom section 50 with a foldable border 56, 57 formed of a straight-line indentation. Each of the side portions 42, 44 further defines a bore 48, 49 at an intersection of a respective foldable border 46, 47 and an edge of the side portions 42, 44 near the foldable border 60. Each of the arm portions 52, 54 further defines a bore 58, 59 at an intersection of a respective foldable border 56, 57 and an edge of the arm portion 52, 54 near the foldable border 60. In the Figure, holes 32 show the porosity for inflowing the synthetic resin thereinto.

Figure 2:
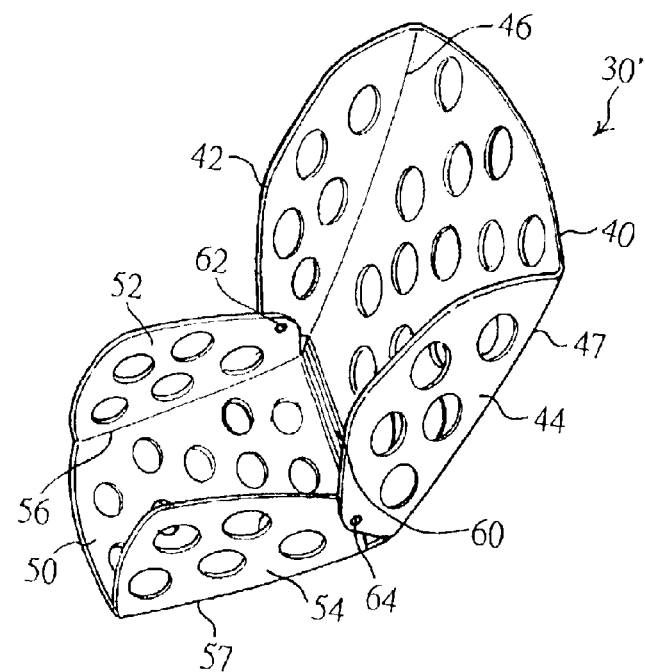
FIG. 2 is a perspective view of a seat frame according to a first embodiment of this invention.

In FIG. 2, the porous plate 30 in FIG. 1 is folded and bonded by rivets 62, 64 to form a seat frame 30' by the steps of: folding arm portions 52, 54 toward each other through an angle of ninety degrees along foldable borders 56 and 57 respectively; folding upper back section 40 and the lower bottom section 50 towards each other along the foldable border 60 in a gentle curve; folding side portions 42, 44 towards each other along the foldable borders 46 and 47 respectively; and fixedly bonding the side portions 42, 44 to the arm portions 52, 54 by means of a rivet 62, 64 extending through bores 48 and 58, 49 and 59 (shown in FIG. 1) respectively. The seat frame 30' is thus formed as shown in FIG. 2.

Figure 3:
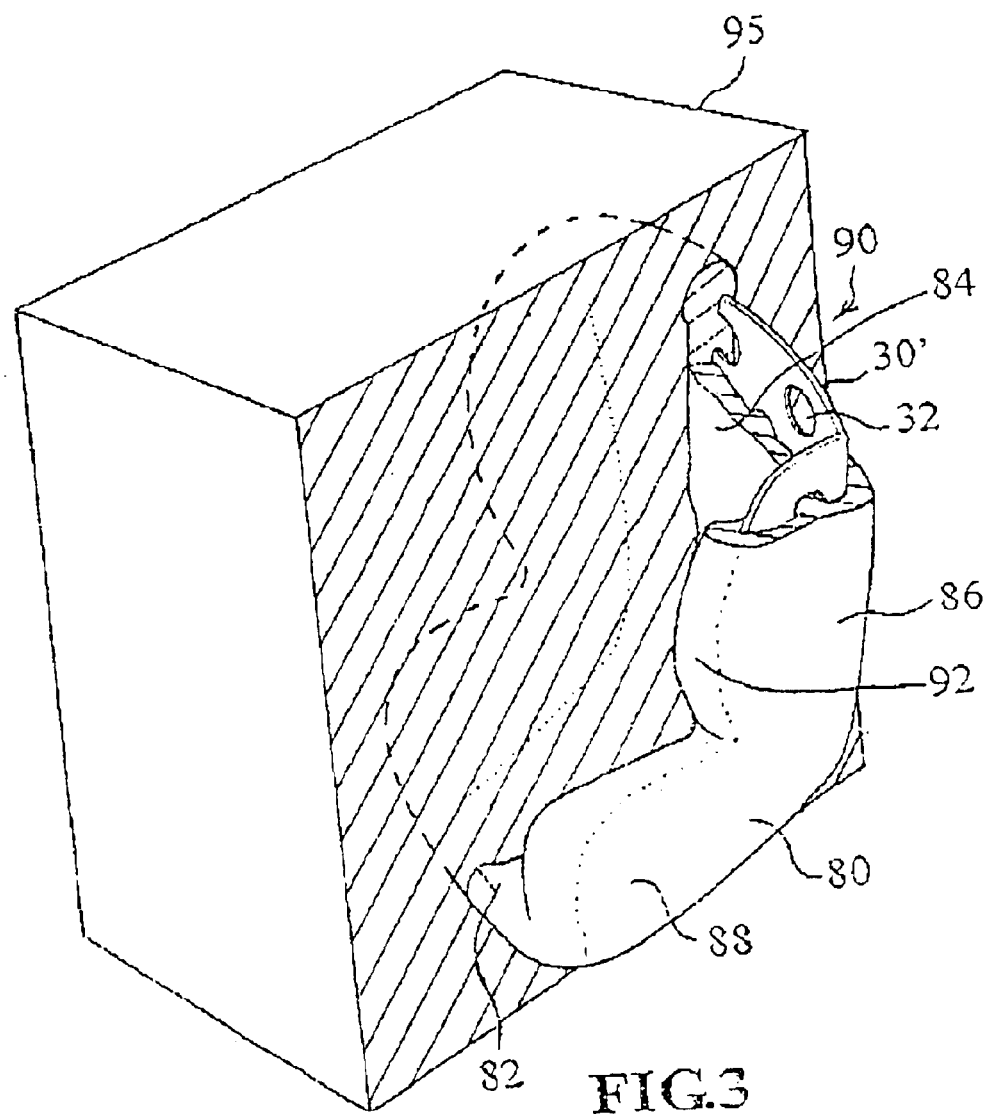
FIG. 3 is a partially cut-away perspective view showing a general construction of an infant safety seat and a mold incorporating this invention.

Once the frame 30' is configured with the side portions and arm portions as mentioned, a cushion substrate 80 is molded over the frame 30' as shown in FIG. 3 by disposing the contoured seat frame 30' in a mold 22 having the shape of the infant safety seat body, pouring foam into said mold and curing the foam to form a padding, and striping the foam from the mold so that a contoured bucket seat body 90 according to this invention is completed. The cushion substrate 80 is for example formed of polyurethane foam to absorb impact. The polyurethane foam for molding the frame 30' inflows into the holes 32 of the frame 30' at the time of molding the seat body 90 so that the cushion substrate 80 may be adhered to the frame 30' because of said polyurethane foam and become integral to each other.

The contoured bucket seat body 90 shown in FIG. 3 includes a seat bottom 82 and a backrest 84. The contoured seat body 90 further includes integral spaced side guards 86, 86 at both sides of backrest 84 and integral spaced armrests 88, 88 at both sides of seat bottom 82, both extending upwardly and substantially perpendicular to backrest 84 along outer peripheral margins of the contoured bucket seat body 90. The outer peripheral margins of the contoured seat body 90 are formed with flanged portions 92. As will be apparent, the integral spaced side guards 86, 86 and the integral spaced armrests 88, 88 keep an infant from rolling out of the contoured bucket seat. Thus a contoured bucket seat body for an infant safety seat which is simple, lightweight and resilient can be provided by use of the embedded frame 30' of this invention.

Figure 4:
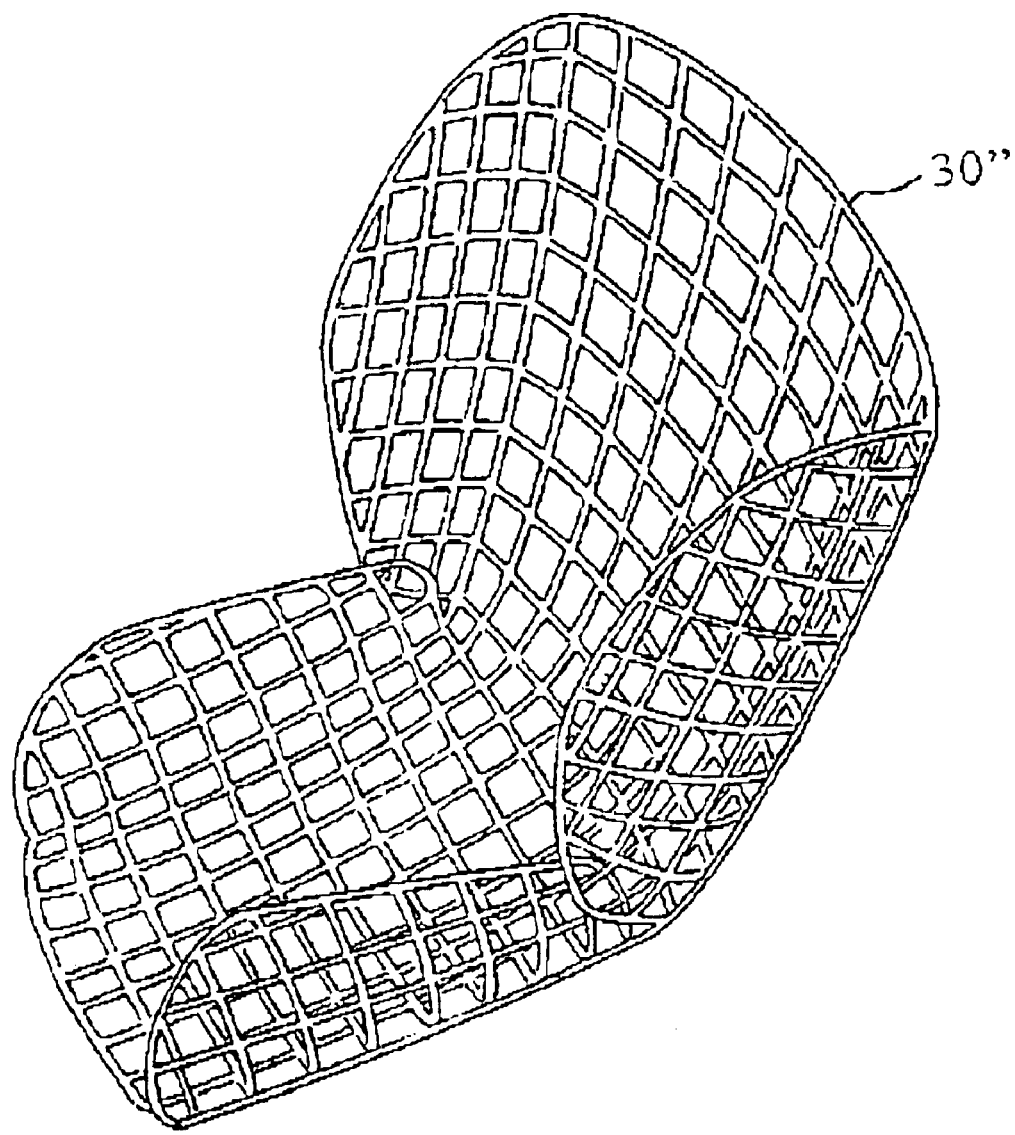
FIG. 4 is a perspective view of a seat frame according to a second embodiment of this invention.
Figure 5:
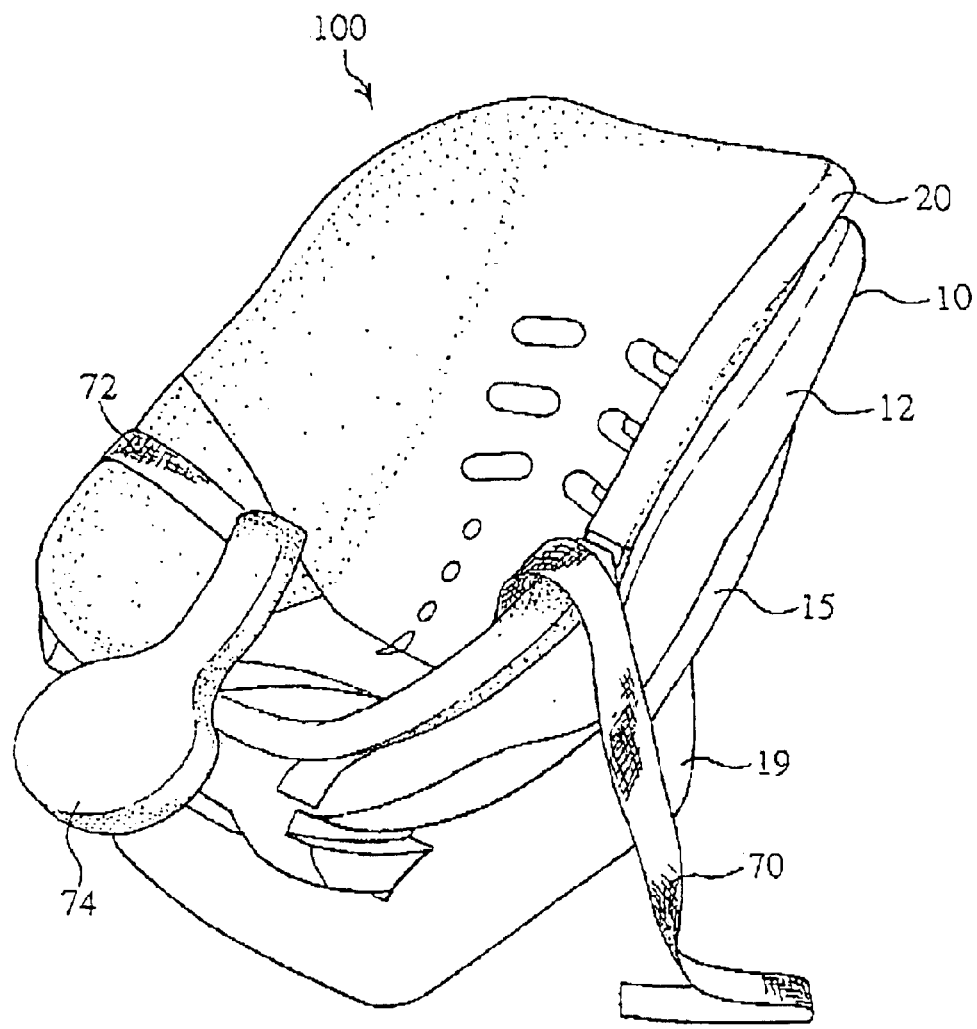
FIG. 5 is a perspective view of a conventional infant safety seat.

It will be understood by those skilled in the art that a seat frame 30" may be formed of a metal web in FIG. 4. For example, the seat frame 30" may be formed of an aluminum web which is formed into an appropriate configuration by conventional metal working procedures, such as welding. In this case, braces (not shown) may be bolted or welded between the arm portions and side portions of the frame to reduce the likelihood of warping or collapse during collisions or other accidents.

Although the present invention has been described in terms of specific embodiments, it is anticipated that alterations and modification thereof will no doubt occur to those skilled in the art. It is intended, therefore, that the following claims be interpreted as covering all such alterations and modifications as fall within the spirit and scope of the invention.

What is claimed is:

1. A process for preparing an infant safety seat body used in vehicles, comprising the steps of:

forming a contoured seat frame by injection molding a synthetic resin into a porous plate, folding and bonding said porous plate so as to form said contoured seat frame;

disposing the contoured seat frame in a mold having the shape of the infant safety seat body;

pouring foam into said mold and polymerizing the foam to form a cushion substrate; and stripping the foam from the mold.

2. A process for preparing an infant safety seat body used in vehicles, comprising the steps of:

forming a contoured seat frame by welding a metal web;

disposing the contoured seat frame in a mold having the shape of the infant safety seat body;

pouring foam into said mold and polymerizing the foam to form a cushion substrate; and stripping the foam from the mold.

* * * * *